United States Patent [19]

Rhodes et al.

[11] Patent Number: 5,251,540
[45] Date of Patent: Oct. 12, 1993

[54] PISTON HAVING AN APERTURE WITH AN INSERT SECURED THEREIN

[75] Inventors: Michael L. P. Rhodes, Rugby; Alan M. Gould, Ladbroke, both of United Kingdom

[73] Assignee: T&N Technology Limited, Warwickshire, United Kingdom

[21] Appl. No.: 713,061

[22] Filed: Jun. 11, 1991

[30] Foreign Application Priority Data

Jun. 23, 1990 [GB] United Kingdom ............... 9014046

[51] Int. Cl.5 ................................................ F16J 1/04
[52] U.S. Cl. ........................................ 92/212; 92/225; 92/228; 123/193.6
[58] Field of Search ................. 92/192, 193, 196, 195, 92/208, 211, 212, 222, 225, 227, 228, 229; 123/193 P, 193.6

[56] References Cited

U.S. PATENT DOCUMENTS

| | | | |
|---|---|---|---|
| 3,442,183 | 5/1969 | Howe et al. ............. | 92/193 X |
| 3,906,923 | 9/1975 | Harker .................. | 92/212 X |
| 3,983,793 | 10/1976 | Beardmore ............... | 92/212 X |
| 4,158,328 | 6/1979 | Beardmore ............... | 92/212 |
| 4,535,682 | 8/1985 | Collyear et al. ......... | 123/193 P X |
| 4,677,900 | 7/1987 | Philby ................... | 92/228 X |

FOREIGN PATENT DOCUMENTS

| | | | |
|---|---|---|---|
| 0238152 | 9/1987 | European Pat. Off. . | |
| 724226 | 4/1932 | France . | |
| 1553752 | 3/1990 | U.S.S.R. ................. | 123/193 P |
| 846819 | 3/1960 | United Kingdom . | |
| 1168527 | 11/1969 | United Kingdom . | |
| 2129523A | 5/1984 | United Kingdom ......... | 123/193 P |
| 2162614A | 2/1986 | United Kingdom . | |

*Primary Examiner*—Edward K. Look
*Assistant Examiner*—John Ryznic
*Attorney, Agent, or Firm*—Nixon & Vanderhye

[57] ABSTRACT

A piston, e.g. for an internal combustion engine, comprises a crown (16) and a skirt (12). The skirt (12) has an aperture (22) in which an insert (14) of a different material from the remainder of the skirt is secured. The insert (14) may be of plastics material injection moulded into a metal skirt. The insert (14) provides a plurality of pads (34) which extend from a thrust surface of the skirt so that the pads can transmit lateral forces and cause lubricant to be forced over the pads by hydrodynamic action during reciprocation of the piston.

6 Claims, 2 Drawing Sheets

PISTON HAVING AN APERTURE WITH AN INSERT SECURED THEREIN

BACKGROUND OF THE INVENTION

The present invention is concerned with pistons for engines or motors, for example, internal combustion engines, or hydraulic or pneumatic reciprocating motors. In particular, the invention is concerned with pistons comprising a crown and a skirt. Such pistons are normally made with the crown and skirt integral and made of metal, e.g. an alloy of aluminium. It is known, however, for the skirt to be of a different material from the crown, e.g. GB 2129523A describes a piston with a metal crown and a plastics skirt. It is also known to provide a skirt with pads which extend from a thrust surface of the skirt (see GB 2104188A). The pads have the purpose of transmitting lateral thrusts of the piston against the wall of an associated cylinder. GB 2162614A describes providing each pad, there are typically three on each thrust surface of the skirt, as a plastics insert in the skirt. In addition., in order to reduce wear of the plastic inserts it is disclosed that each plastic insert is bevelled apropriately to cause provided lubricant to be forced over the plastic insert by a hydrodynamic action during the reciprocation of the piston. The inserts have to be individually mounted on the skirt, each in an individual recess which is an undesirably complex operation.

The presence of the plastics inserts, due to compliancy or conformability, can allow smaller operating clearances in the cylinder bore than otherwise would be the case. However, it is required that the plastics inserts are sufficiently stiff to withstand thrust loading without significant distortion occurring which, in turn, depends on the thickness and composition of the inserts. The provision of smaller operating clearances implies that piston slap noise is reduced, and any slap impact is also quietened by the natural damping characteristics of the plastics material. Further, improved piston stability, because of the provision of smaller operating clearances, can enhance the seating capabilities of the ring pack provided with the piston.

In any such known arrangement, the total area of the inserts is only a small proportion of the area of the piston skirt.

Lighter pistons are advantageous in that the reciprocating mass of the engine or motor is reduced, improving fuel consumption, noise, and increasing the possible speed of operation. Further, it is possible to employ lighter connecting rods and smaller bearings, in association with lighter pistons.

It is an object of the present invention to provide a piston having pads of a different material from the remainder of the skirt which is of simple construction.

BRIEF SUMMARY OF THE INVENTION

The invention provides a piston for an engine or motor comprising a crown and a skirt, wherein the skirt has an aperture therein in which an insert made of a different material from the remainder of the skirt is secured, the insert providing a plurality of pads each of which has beveled edges designed to cause lubricant to be forced over the pad by hydrodynamic action during reciprocation of the piston, the pads extending from a thrust surface of the skirt so that the pads can transmit lateral thrusts of the piston against a wall of an associated cylinder.

In a piston according to the invention, all the pads required on a thrust surface can be provided in a simple manner on a single insert.

The skirt may be made of metal and the insert made of plastics material. This gives a skirt of reduced weight.

The insert may be secured in its aperture by being injection molded into the aperture. The injection molding is preferably from an inwardly facing surface of the skirt.

Since the area to be occupied by the pads is related to the diameter of the associated cylinder, it is preferred that the insert has a total area equal to between 30 and 40 per cent of the transverse cross-sectional area of the associated cylinder.

Preferably, a further insert also providing a plurality of pads is secured in an aperture of the skirt which is diametrically opposed to the first mentioned aperture. In this way, all the pads required can be provided by only two inserts.

BRIEF DESCRIPTION OF THE DRAWINGS

The present invention will now be described by way of example with reference to the accompanying drawings, in which.

DETAILED DESCRIPTION OF PREFERRED EMBODIMENTS OF THE INVENTION

Figure 1:
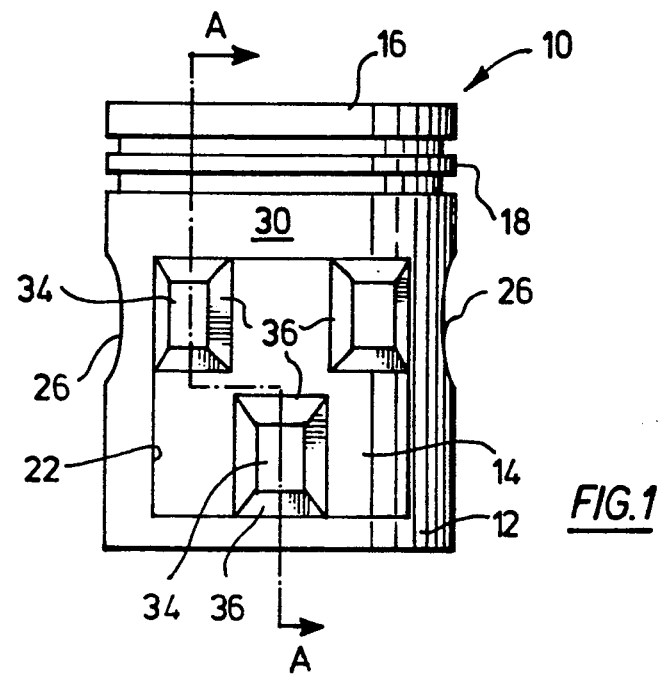
FIG. 1 is a side elevation of one embodiment of a piston for an internal combustion engine and in accordance with the present invention, and having an insert provided in an aperture through one thrust face of the piston skirt.
Figure 2:
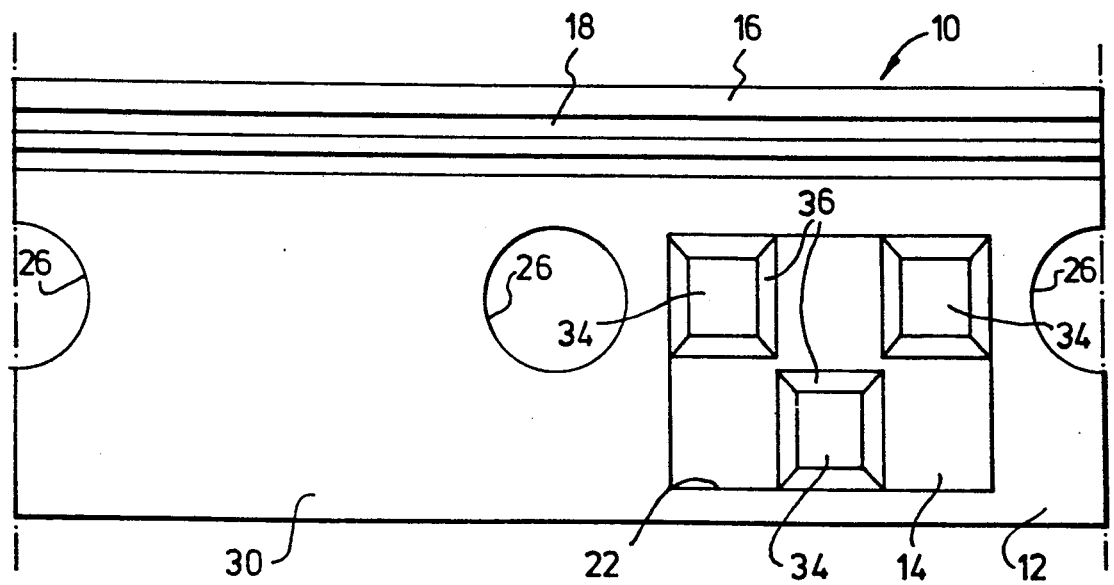
FIG. 2 is a representation of the outer surface of the piston of FIG. 1 when considered to be unrolled on to a plane.
Figure 3:
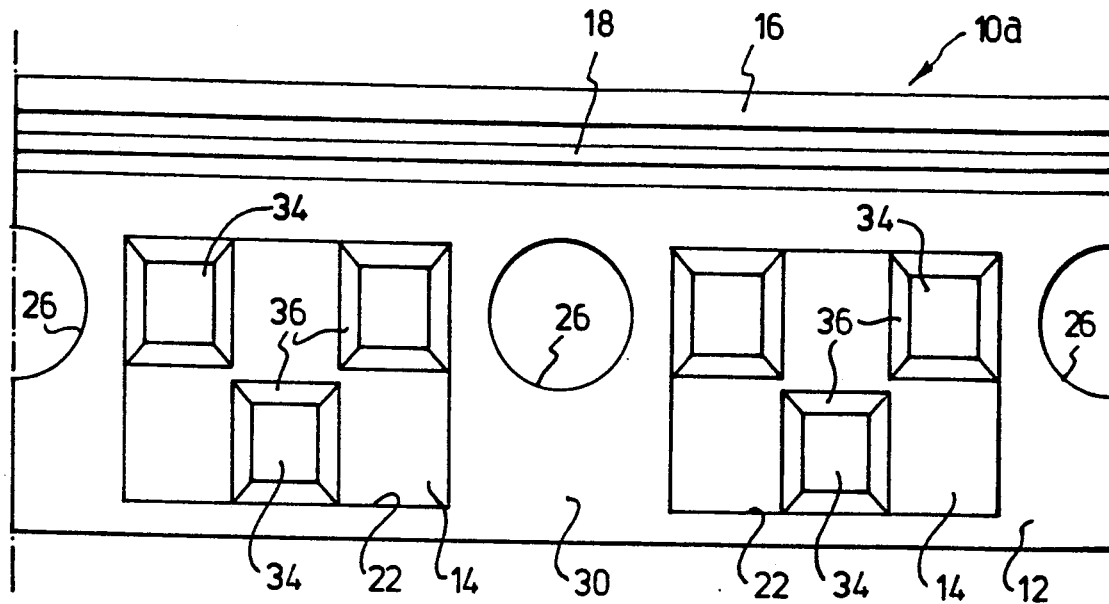
FIG. 3 corresponds to FIG. 2, but is a representation of the outer surface of another embodiment of a piston in accordance with the present invention, and having an insert provided in an aperture through each of the two thrust faces of the piston skirt.
Figure 4:
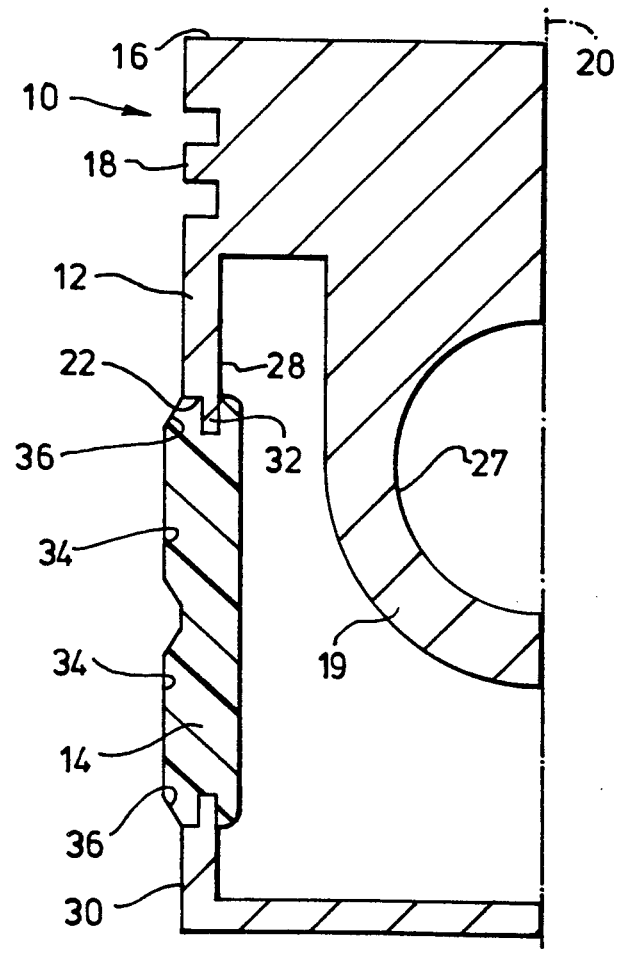
FIG. 4 is a half section of the piston of FIGS. 1 and 2, viewed along the gudgeon pin bore in the direction of the arrows A of FIG. 1.

The piston 10 shown in FIGS. 1, 2 and 4, and the modification 10a thereof shown in FIG. 3, has a skirt 12 with at least one insert 14 of a plastics material within the remainder of the skirt, the remainder of the skirt being of a metal. The metal portion of the skirt 12 depends from, and is integral with, a metal crown 16 of a conventional construction. The metal of the piston 10 is an alloy of aluminium. Included within the crown 16 is a ring belt 18, and a boss 19 (FIG. 4) for the gudgeon pin (not shown). The piston axis is indicated by the broken line 20 in FIG. 4.

The piston 10 shown in FIGS. 1, 2 and 4, in accordance with the present invention, has a single insert 14 having an area comprising a significant proportion of the area of the skirt 12. As shown in FIG. 4, the insert 14 is secured within a rectangular aperture 22 formed in the skirt. As shown in the representation of the piston 10 unrolled on to a plane as indicated in FIG. 2, the insert 14 occupies a major proportion of one thrust face of the skirt. Holes in the skirt for use in assembling the gudgeon pin into a bore 27 in the boss 19 are indicated by 26 in the Figures.

By selecting a suitable plastics material for the insert as referred to below, the piston 10 is more compliant and lighter in weight than if the skirt had been wholly of metal.

In the modified form of piston 10a shown in FIG. 3, FIG. 3 also being of a representation of the piston unrolled on to a plane, two inserts 14 are provided, with each insert being of a plastics material and being secured within separate apertures 22 formed in the skirt 12. Each insert 14 occupies a major portion of an individually associated thrust face of the skirt. Thus, the two inserts 14 are diametrically opposite to each other. Hence, the piston 10a is even more compliant and lighter in weight than the corresponding piston 10 of FIGS. 1, 2 and 4, when the remainder of the skirt, and the inserts 14, are of the same materials as in the embodiment of FIGS. 1, 2 and 4.

The or each insert 14 is provided within an aperture 22 through the metal portion of the remainder of the skirt by a conventional injection moulding process. In particular, the or each insert 14 is provided by injection moulding from the inwardly directed surface 28 of the skirt 12, to the opposing outer surface 30 of the skirt. As shown in FIG. 4, within the aperture 22 is provided a shoulder 32 at the inner portion of the periphery of the aperture-defining skirt part. In the injection moulding process, the plastics material is provided to be contiguous with the outer portion of the periphery of the aperture-defining skirt part, to extend through the aperture 22, and to extend over a portion of the inwardly directed surface 28 aound the shoulder 32.

Thus, the insert 14 is secured within the aperture 22 in a satisfactory manner by being keyed around the shoulder 32. The or each aperture 22 is formed through the skirt 12 in any convenient manner.

Alternatively, the insert 14 may be moulded separately and secured in the aperature 22 through the skirt 12 in any convenient way. The insert material may be caused to extend over the inner surface 28 of the skirt, after the insert has been mounted in the aperture 22 by employing any suitable plastics-forming process, in order to secure the inset within the aperture.

The insert 14, or both inserts 14, also transmit lateral thrusts of the piston against the wall of an associated cylinder (not shown). For this purpose, on each insert 14, there are provided three spaced bearing pads 34 which extend radially outwardly further than the remainder of the skirt 12. In order to reduce wear, each pad 34 is bevelled as indicated at 36 to cause provided lubricant to be forced over the pad 34 by a hydrodynamic action during reciprocation of the piston 10. Equivalent hydrodynamically lubricated pistons are disclosed in UK patent specifications Nos. 2162614 and 2104188. For the sake of clarity, the relative thickness of the insert 14 is exaggerated in FIG. 4.

The outer surface 30 of the metal part of the skirt 12 may be machined after the or each insert 14 is formed therein. The outer surfaces provided by the insert 14 may also be machined, at least so that any flash is removed. The intersections between the bearing surface 34 and the bevels 36 of each insert 14 may be smoothly rounded.

Two plastic inserts 14 for a piston skirt 12 in accordance with the present invention, and as shown in FIG. 3, conveniently have a total area within the range 30 to 40% of the cross-sectional area of the cooperating cylinder bore.

Usually, a suitable plastics material for an insert has a density of approximately half the density of an aluminium alloy providing the remainder of the piston skirt. If the volume of metal replaced by two plastic inserts is substantially the same as the volume of the insert, the piston may be 5 to 7% lighter in weight.

When an insert is of a suitable plastics material, for example, it may be of polyetheretherketone, polyetherketone, a polyparahydroxybenzoic acid, polyethyleneterephthalate, a silicon modified polyester, a polyetherimideimide, or polyethylene sulphide, or a plastics alloy of polyetherketone and a polyarylene sulphide; or Nylon 6 modified with terephthalic acid; or a suitable combination of any such plastics material.

The plastics material may be reinforced by including fillers, fibres or wires of glass, a metal, a ceramic, boron, coke, carbon possibly in the form of graphite, a polyarimid, or any suitable organic material.

Any such plastics material is advantageous in that it provides inserts which are rigid, conformable, and have low friction surfaces.

The insert material may be post cured to increase its strength.

When more than one insert is provided, different inserts may be of different materials.

Suitable plastics materials, especially composite plastics materials, as referred to above are also advantageous in that piston parts fabricated therefrom maintain their shape under normally encountered engine operating conditions. Such parts have high mechanical fatigue, tensile compressive and flexural strength. In addition, they are resistant to wear, corrosion, impact, rupture, or creep. Further, they have a greater stiffness-to-weight ratio than other known materials for piston parts. Any difference between the coefficients of thermal expansion of such a material for the inserts and the material of the remainder of the piston skirt is usually without any adverse effect on the piston construction.

Instead of being integral with the crown, the part of the skirt not comprising the inserts may be of a different material from that of the crown, and be secured to the crown in any convenient way.

The part of the skirt not comprising the inserts may not be of an alloy of aluminium, and may not be of a metal, for example, instead being of a suitable plastics material different from the material of the inserts, such as any one of the materials referred to above in relation to inserts.

The crown may be of a suitable ceramic material, or of a suitable ferrous material.

Pistons in accordance with the present invention also may be included in engines or motors other than internal combustion engines. Where appropriate, a piston in accordance with the present invention may comprise an articulated piston.

We claim:

1. A piston for an engine or motor comprising a crown and a skirt, wherein the skirt has an aperture therein in which an insert made of a different material from the remainder of the skirt is secured, the insert providing a plurality of pads each of which has bevelled edges designed to cause lubricant to be forced over the pad by hydrodynamic action during reciprocation of the piston, the pads extending from a thrust surface of the skirt so that the pads can transmit lateral thrusts of the piston against a wall of an associated cylinder.

2. A piston according to claim 1, wherein the skirt is made of metal and the insert is made of plastics material.

3. A piston according to claim 1, wherein the insert is secured in its aperture by being injection molded into the aperture.

4. A piston according to claim 3, wherein the insert is injection molded from an inwardly facing surface of the skirt.

5. A piston according to claim 1, wherein the insert has a total area equal to between 30 and 40% of the transverse cross-sectional area of the associated cylinder.

6. A piston according to claim 1, wherein a further insert also providing a plurality of pads is secured in an aperture of the skirt which is diametrically opposed to the first-mentioned aperture.

* * * * *